Jan. 24, 1939.　　　　　　　C. SMITH　　　　　　　2,145,032

AUTOMATIC STOCK QUOTATION DISPLAY BOARD

Filed July 30, 1929　　　3 Sheets-Sheet 1

INVENTOR
CLYDE SMITH
BY *T. Hutchinson*
ATTORNEY

Patented Jan. 24, 1939

2,145,032

UNITED STATES PATENT OFFICE 2,145,032

AUTOMATIC STOCK QUOTATION DISPLAY BOARD

Clyde Smith, Hopkinsville, Ky., asssignor, by mesne assignments, to International Standard Electric Corporation, New York, N. Y., a corporation of Delaware Application July 30, 1929, Serial No. 382,268

4 Claims. (Cl. 177—353)

My invention relates generally to quotation boards, and relates more particularly to the means for selecting on a quotation board any one of a number of register groups adapted to display quotations pertaining to several stocks or commodities, and to the means for setting only those registers of the selected group which must be reset in order to display the current quotation on the particular stock or commodity.

The object of my invention is to provide on the registers of a quotation board a complete display of the prices of stocks, grain, cotton, and other commodities traded on an exchange or market, as such prices are transmitted from moment to moment throughout the market day, together with auxiliary information in connection with such prices, as opening, lowest, and highest prices in the record.

For the display of quotations as widely practiced in the offices of brokers and others, prices as they are received are for the most part written up by hand on a blackboard. The invention herein described is designed to perform a like service by the display of selected figures transmitted by wire from a central office.

The complete display board comprises an assembly of commodity or stock units, perhaps forty-eight in number, each of which is assigned to a particular stock or commodity. Each unit consists of a group of registers and each group is divided into a number of sub-groups or shelves, each having a plurality of registers for indicating the several orders of digits and the fractions of the price.

The registers on each shelf are adapted to indicate a particular quotation, each a high, low or the last quotation of the current day.

Corresponding registers on the several shelves of the same unit, such as the registers for indicating the tens digit of the price, are mounted on the same shaft. The shaft on which the hundreds registers on the several shelves of a unit are mounted is termed herein the hundreds shaft, and similarly the shafts on which the tens, units and fractions registers on the several shelves of a unit are mounted are respectively termed herein the tens, units and fractions shafts.

The hundreds, tens, units and fractions shafts of the several units are respectively connected, through intermediate gearing, to a common hundreds shaft, a common tens shaft, a common units shaft and a common fractions shaft. It is thus evident that the movement of either the common hundreds, tens, units or fractions shafts will effect the similar movement of the hundreds, tens, units or fractions shafts, respectively, of the several units on the board.

Motor means are associated with each of the common shafts. Fractions, units, tens and hundreds price selectors are provided for variably operating the motor means, respectively, associated with the common fractions, units, tens and hundreds shafts to position these shafts in accordance with the operation of the corresponding selectors. A tens and a units stock or commodity selector, and a stock or commodity connector switch operable in response to the operation of these selectors are provided for conditioning the registers of a particular stock or commodity for subsequent positioning. A shelf selector is provided for positioning the registers on predetermined shelves of the selected unit in accordance with the previous setting of the common shafts.

A sequence switch is provided for placing the selectors under control of a transmitter in consecutive order, or for placing a predetermined selector, or predetermined selectors, under control of this transmitter. This transmitter may be placed at a central office, remote from the display office, at which the quotation board is located, and the transmitter may also be arranged to control a plurality of selectors at different display offices, thus posting quotations on a plurality of quotation boards simultaneously.

It is believed that the principle of positioning the dials by a common shafting system, as herein described, insures accuracy, quick operation, and substantial economy of construction.

Since the shafts do not set the registers, but the registers are set to the position of the shafts by independent means, the common hundreds, tens, etc., shafts of the several units of the quotation board can be set to a new position regardless of the existing display by transmitting impulses corresponding to the new position. Hence the change from an old to a new figure on any register is effected without return to zero, without driving a register from its previous position, through the higher numerals on the register to the numerals lower than the one previously displayed, and without mental or automatic use of the arithmetical difference between the numerals previously displayed by the register and the numeral to be diplayed when the register is moved to its new position. Furthermore, the independent means for moving the register to the position of their associated shafts permits the hundreds, tens, etc., shafts of the several units to be positioned independently of one another, thus eliminating the transmission of all impulses except those required to reset those registers of the particular stock unit which display a digit or a fraction different from the digit of that order or the fraction in the new quotation for that particular stock. It also permits common shafting, such as common hundreds, tens shafts for positioning the corresponding hundreds, tens shafts of the several units on the quotation board.

The provision for operating the sequence switch automatically upon the occurrence of an interval between received impulses slightly greater than the interval between the impulses transmitted by the sending mechanism, permits the selector switches to be operated consecutively by successive series of received impulses without requiring an equal wire time for each one of the successive series.

I have illustrated a display unit and the mechanism for selecting a commodity arbitrarily designated by a number in two digits, mechanism for setting up a price in one or two digits and a fraction in a single shelf or on a number of shelves in a commodity unit. It is evident that a simple extension of the described mechanism and circuits would permit the selection of a greater number of commodity or stock units, and also permit the display of quotations requiring a larger number of registers on each shelf. It is also obvious that another like register shelf (or a seldom used one of those shown) could be utilized for displaying a record of the quantities of commodities or stocks sold in successive market transactions.

In the drawings:

Fig. 4 is a perspective front view of an upper shelf of price display registers, all operated by a single magnet. Four such shelves include registers for Previous Close, Open, High and Low quotations.

Fig. 5 is a side view of a single register on the last shelf LQ together with the magnet individual thereto for positioning this register in accordance with the position of the associated shaft. A section of the common shaft for positioning the shaft associated with this register is also shown, as is also the gearing between the last mentioned shaft and the common shaft.

Figs. 6 to 11 relate to another form of display register and operating parts therefor.

Fig. 6 is a side view of such a register with portions thereof cut away, to show the operating mechanism in side view, with the solenoid in section.

Fig. 7 is a side view in section of the solenoid.
Fig. 8 is a side view, and Fig. 9 a front view, of the modified form of cam.

Fig. 10 is a front view of the retaining bracket, with crown teeth, for restraining the register from idle movement with the shaft.

Fig. 11 is a sectional view of the register, showing the sleeve bearing and guide pin.

Fig. 12 is a side broken view of a display register unit, showing the interior mechanism.

Fig. 13 is a front view showing the contour of the modified cam.

DESCRIPTION OF APPARATUS

Central office

Figure 1:
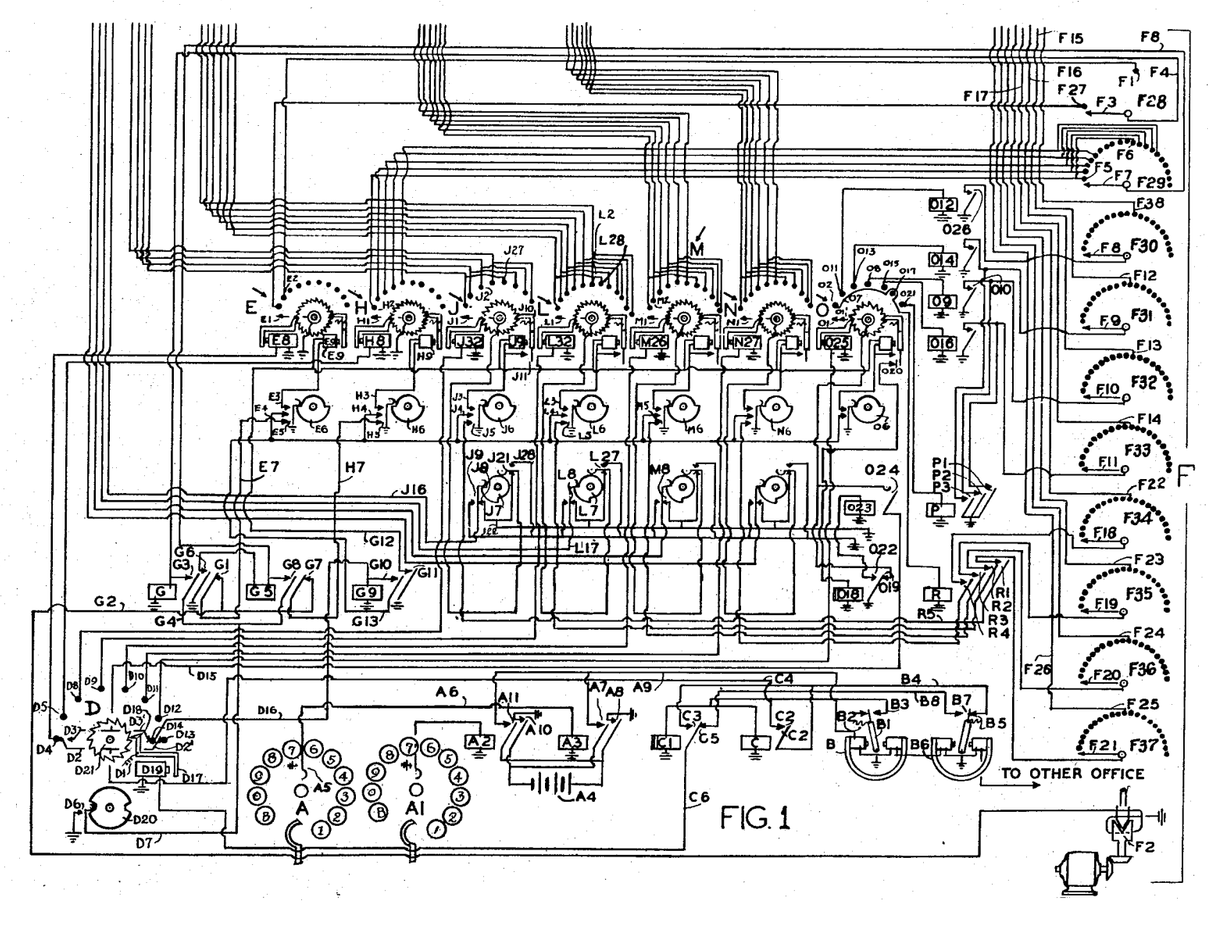
Fig. 1 illustrates schematically the transmitting apparatus at the central office and the receiving and selecting apparatus and circuits in a display office.

In Fig. 1, A and A1 refer to the transmitting mechanism, herein shown for convenience of illustration in the form of conventional finger-pull dials, whereby a predetermined number of either positive or negative impulses can be transmitted over line A9 to the display station. A sends positive, and A1 negative, pulses; A for directly operating in turn the several selector switches, as E, H, J; and A1 for moving the sequence switch D past selector switches that are not required to be operated in the posting of a particular quotation. This latter action I refer to as "skipping". The transmitting devices are representative of all the apparatus required at the central office. A and A1 operate the repeating relays A3 and A2 respectively, which determine the polarity of battery A4 to be impressed on the line A9 connected to the display station.

The remainder of the apparatus to be described is situated in a display office. The central office, as previously mentioned, is suitably connected by conductors A9 to the display office at which is located an automatic quotation board. A plurality of display offices may be operated from a single central office in a manner well known in the art.

Display office

Sequence Switch.—B and B6 are polar receiving relays which determine whether the sequence switch D is to associate consecutive selectors, such as E, H, J, etc., with the pulsing circuit C4, thus placing these selectors successively under the control of dial A, or whether the sequence switch D is to be stepped by a number of selectors, without placing them under control of dial A, until a particular selector is associated with the pulsing circuit C4 and thus placed under control of dial A. Relay B, responsive to positive currents, operates repeating relay C, which directly transmits pulses by conductor C4 through the several contacts of sequence switch D, relay C responding to each movement of B.

Controlled by relay B are repeating relay C and slow-release relay C1. Upon the operation of relay B, both of these relays are energized over obvious circuits. Relay C closes the pulsing circuit C4 through a contact of the sequence switch D to a selector associated with that contact, and completes the pulsing circuit at ground on the armature of receiving relay 136. Relay C1 completes an obvious circuit for operating stepping magnet D19 of sequence switch D. In response to impulses transmitted from dial A, relay B causes relay C to respond, stepping the selector associated by the sequence switch with pulsing circuit C4. At the end of the series of impulses, relay B releases, as does also relay C, and after an interval, slow release relay C1 also releases, opening the circuit of stepping magnet D19 of the sequence switch D.

Polar receiving relay B6, which is responsive to negative impulses from dial A, controls the stepping magnet D19 of sequence switch D over an obvious circuit. In response to the operation of dial A1, relay B6 will therefore cause sequence switch D to step once in response to each received impulse.

The sequence switch D has a plurality of contacts D4–D13 inclusive, to which the stepping magnets, such as E8, H8 of selectors, such as E and H are connected, and a contact D14 to which a release relay G9 is connected. Wipers D2 and D2' are adapted to establish contact with contacts D4–D13 inclusive, and wipers D3 and D3' are adapted to establish contact with D14. The wipers of each pair, as D2 and D2', and D3 and D3', are mounted on a shaft in diametrically opposite relation to one another, so that wipers D2 and D3 are associated with the contacts mentioned, while the shaft is revolving through one-half a revolution, and wipers D2' and D3' are associated with the same contacts when the shaft is rotating through the other half of its revolution. Likewise attached to the shaft is a ratchet wheel D21, driven by a pawl D17, which is advanced one step by stepping magnet D19, and retracted by an attached spring upon the de-energization of the stepping magnet. It is evident that each energization and de-energization of the stepping magnet D19 will move the shaft, and the wipers mounted thereon, a single step, thus associating the pulsing circuit C4 with the stepping magnets of the next selector, as H, J, etc. Also mounted on the shaft is a cam D20 having similar re-entrant portions at diametrically opposite points on its circumference. Co-operating with this cam is a follower which controls contact D6. It is evident that the cam D20 acts as an off-normal switch at the first step of the shaft during each half of its revolution, and at these times ground is placed on conductor D7.

*Commodity selectors.*—The commodity or stock selectors E and H are illustrated in the conventional form of step-by-step switches. Selector E has a grounded wiper E1 which is adapted to cooperate with a bank of contacts, such as E2, etc., each of the contacts being connected to a contact in the upper bank of contacts in stock or commodity connector switch F. In the illustration, the connector switch F is shown with but twenty contacts to a bank, and hence but two contacts of the selector E are connected to the uppermost bank of contacts of the connector. In actual practice, however, the connector F might be provided with a hundred and one contacts in a bank, in which case each of the ten contacts in the bank of selector E would be connected to a contact in the uppermost bank of the switch F. For example, consecutive contacts of selector E, beginning with the first would be connected to contacts 1, 11, 21, 31, 41, etc., of the uppermost bank of connector F. The wiper E1 of selector E is mounted on a shaft, which is driven step-by-step by the co-operation of a ratchet wheel and a pawl, the pawl being actuated by the stepping magnet E8. Mounted on the same shaft is a cam E6, with a follower, which is adapted to ground contacts E3, E4 and E5 upon the first movement of the shaft. The function of the selector E is to start the connector switch F and to stop that switch when the wiper F3 reaches one of the contacts F3, F4, etc., on the uppermost bank previously grounded by selector E. The connector switch F is thus conditioned for selecting a predetermined contact in the proper tens group upon the operation of units selector H.

The units, commodity or stock selector H is similar in construction to the hundreds commodity or stock selector E. Its wiper H1 is adapted to ground corresponding contacts in each sector of the bank next to the uppermost bank of connector F, and after starting the connector switch wiping over the contacts in the sector to which the connector has been moved by the operation of selector E, stops the connector F when the wiper F5 reaches the contact in that sector grounded by selector E.

*Price selectors.*—J is the fraction price selector, of like type. It is the first to operate of the four price selectors, J, L, M and N, etc., in this three-digit-and-fraction system although, of course, more than three digit and fraction price selectors may be employed. The J fraction price selector is here shown fitted with eight contacts, one for each eighth, for contacts 1 to 7, and the eighth for a blank space, on the fraction dial. The first contact is multiplied with the fifth, the second with the sixth, third with seventh, fourth with eighth. Each pair of contacts is wired to a pair of stator coils in the associated motor S. The wiring of this switch is so arranged through the cam J7 and the contacts J8, J9, J21 and J28 that positive battery will be put on the first to fourth, ⅛ to ½, contacts, and negative battery on the fifth to eighth contacts, ⅝ to the blank.

In like manner similar conditions are obtained in utilizing price selector switches L, M, N.

L is the units price selector, of the same type and operating characteristics as J. However, it has twelve contacts, ten being needed to cover the figures 1, 2, 3 . . . 0, and two blank spaces to be displayed on the dial when there is no quotation price. The twelfth is added to effect the desirable even number of spaces for the paired stator coils.

M is the tens price selector. It likewise has the twelve contacts, and in all other respects is like J and L.

N is the hundreds price switch selector comprising 12 contacts and in all other respects it is like J, L, and M.

It may be noted that changes in stock quotations are made most frequently in the fractions, and that the units price selector will be passed over in many operations, and the tens and hundreds in most; hence the described order of arrangement.

*Shelf selector.*—O is a shelf selector switch with seven contacts and is similar in design to the selectors previously described. It selects the various shelves of display dials (Figure 3) and their magnets to be operated. The first contact, O2, will operate relay R, which in connection with the operated price selectors, will set up circuits to operate the selected registers on the lowest shelf for the last quotation.

Selector O has two wipers, O1 and O1' electrically connected together. O1 engages the contacts, as O2, O11, and the like. Wiper O1' contacts with the common contact O7, which is in circuit on all positions except O11 and is also electrically connected to contact O2. The use of this second wiper, O1', causes relay R to be energized on all positions except O11. This is a blank position that can be used for a no-register in case an error has been made in transmitting impulses, to be followed by release and new transmission.

Contact O11 is connected with relay O12, which through its contact O26 sets up a circuit to energize the shelf operation magnet K33 of the previous close registers, on the uppermost shelf of display dials. Contact O13 energizes relay O14, and sets up a like circuit to energize the shelf operating magnet, as K9, for the opening figures of the current day, to be displayed on the registers of the second shelf. Contact O8 energizes relay O9, and sets up a circuit to operate the dials of the third shelf for the highest figures so far reached in the current quotations. Contact O15 energizes relay O16, and sets up a circuit to operate the registers of the fourth shelf for the lowest figures so far reached in the day's quotations.

Contact O21 energizes relay P, which closes contacts P1, P2, and P3, which will set up a circuit through wipers F9, F10, and F11 to energize the open, high, and low shelf magnets. With the wipers O1 and O1' standing in this, the seventh and all other positions except the sixth position, relay R is also energized, through the common contact O7, which will set up circuits, as contacts R3 and wiper F19, to energize the several last magnets, of the lowest shelf.

*Connector.*—F is the connector stock selector switch, through which are selected the commodity units and the operating magnets of the various registers in the selected unit. This switch is motor-driven, its shaft, which carries all wipers, such as F21, being brought into motion by magnetic clutch F2. An exemplification of the type of connector that may be used in the present system, is shown by the United States patent to W. N. Bruce, Jr., No. 1,161,837.

Banks of contacts F29—F37 are provided with twenty contacts each, while bank F28 is provided with one contact, F27, corresponding to the first and one contact, F1, corresponding to the eleventh contact in each of the other banks. It is to be understood that in actual practice each of the banks F29—F37 might be provided with one hundred contacts, in which case bank F28 will be provided with additional contacts corresponding to the twenty first, thirty first, etc., contacts in the banks F29—F37.

Contact F27 in bank F28, when grounded by tens stock selector E, causes the connector F to stop when all of the wipers F3, F7, F8, etc., are on a contact, corresponding to contact 27, in their associated banks. When the units stock selector H grounds one of the contacts in bank F29, between contacts F5 and F6, the connector F, which was started on the first movement of selector H, is stopped when wiper F7 reaches the grounded contact. The registers of a predetermined stock unit, connected to the several contacts of the remaining banks F30—F39 inclusive, on which the wipers F8, F9, etc., are now resting, are thus conditioned for subsequent positioning. Thus corresponding contacts F23, F24 and F25 are shown connected to the tens K21, units K20, and fractions K19, display registers of the last shelf LQ of the stock unit of Fig. 3. Contact F22 is shown connected to magnet K22 of the hundreds display register of the same shelf, while contacts F14, F13, F12, and F38 are shown connected to the shelf operating magnets K11, K10, K9 and K33 of the low, high, open and previous close shelves, respectively. It is to be noted that corresponding contacts in successive sectors of bank F29, as contacts F5 and F6, are multiplied. This is to enable the units stock selector H to ground corresponding contacts in the several sectors simultaneously and prepare a circuit for stopping the connector F regardless of the sector over which it rotates when started by the movement of selector H. Thus, if the tens stock selector E had been advanced two steps, and the connector F stopped when wipers F3 reached contact F1 of bank F29, the selector E, when operated, would ground a corresponding contact in both the first and second sectors of bank F29. The wiper F7 would not rotate over the contacts in the first sector of bank F29 in this case, however, but would rotate over the contacts in the second sector until it reached the grounded contact, upon which connector F would be stopped. Thus, the registers of a commodity or stock unit designated by some number in the twenties, such as 25 or 26, would be selected. It is obvious, from the above description, that if each of the banks F29—F37 were provided with one hundred contacts, and bank F28 provided with ten contacts, the commodity or stock selectors E and H would co-operate with the banks F28 and F29 of the connector to select the registers of any one of one hundred stock or commodity units.

Figure 2:
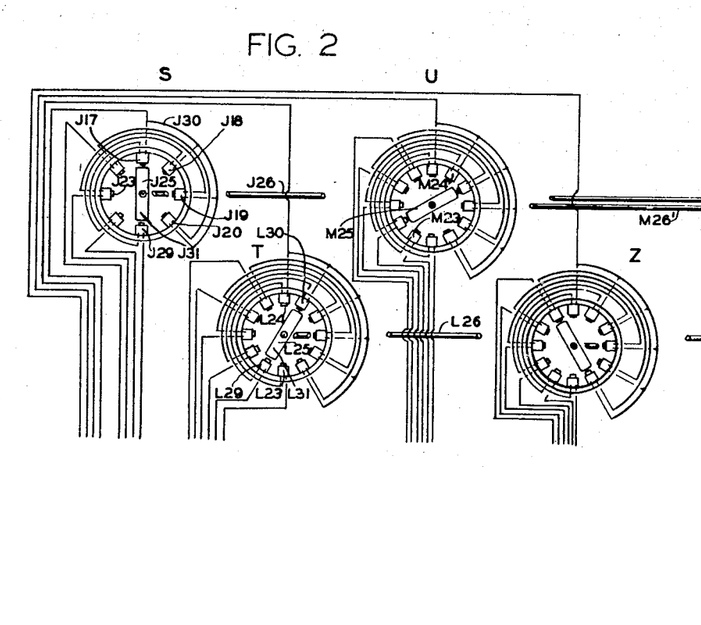
Fig. 2 is an end view of four rotors, each adapted to drive an associated shaft, positioning the corresponding shafts of each of the several units of the board.

*Prime movers and shafting.*—Figure 2 shows four conventional prime movers, S, T, U, and Z, respectively for the fractions, units, tens and hundreds.

The fraction stator, of S, has eight coils mounted in the frame and so proportioned and wired that they are arranged in four pairs. The first coil, J29, and the fifth, J17, directly opposite, are paired; the second and sixth, third and seventh, and fourth and eighth are also paired. Stators of T, U and Z are of like construction; each of these, however, has twelve coils, in six pairs. Each prime mover has a rotor, as J25, here illustrated as a permanent magnet (in lieu of a conventional armature) with suitable bearings, to transmit motion to register-positioning shafts, J26, L26, M26 and N26, which are here shown in fragmentary side view, broken away to exhibit the prime movers more clearly. It is evident that when coil J29 is positively charged and J17 negatively charged, and one end of the magnet bar, as J31, is the positive end, and the other end negative, the rotor will reverse its position. Its movement will rotate shaft J26 correspondingly.

Each prime mover, with its shaft, is associated with an order of figures to be displayed on the dials, one shaft driving the fraction display registers, one the units, the third the tens and the fourth the hundreds.

Figure 3:
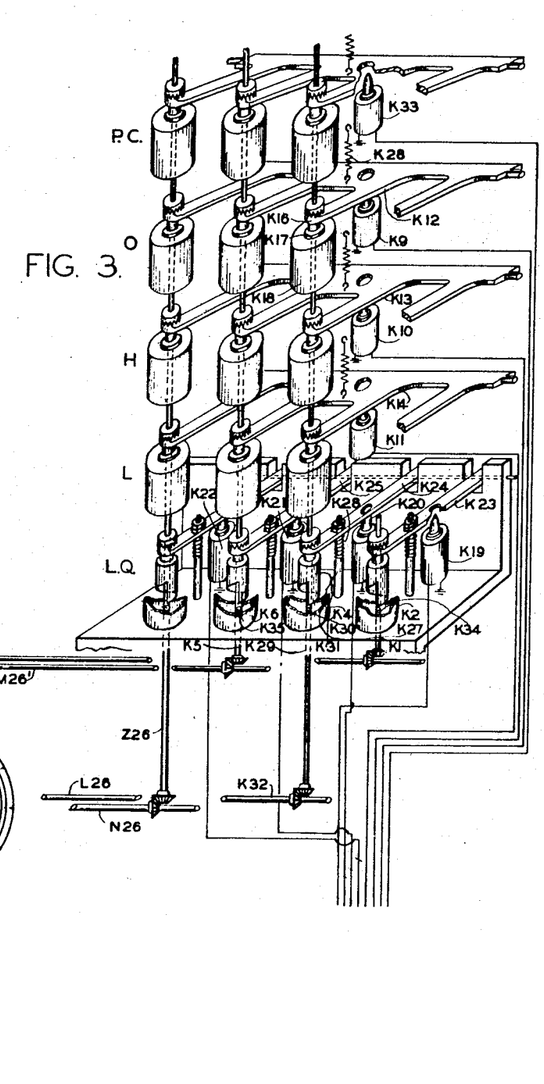
Fig. 3 is a front view in perspective of a commodity or register unit, with the price display register, the four upper shelves being broken away to show shelf magnets, and the registers of the lower shelf being broken away to show the cams for positioning the registers.
Figures 4, 5, 6, 7, 8, 9, 10, 11, 12, 13:
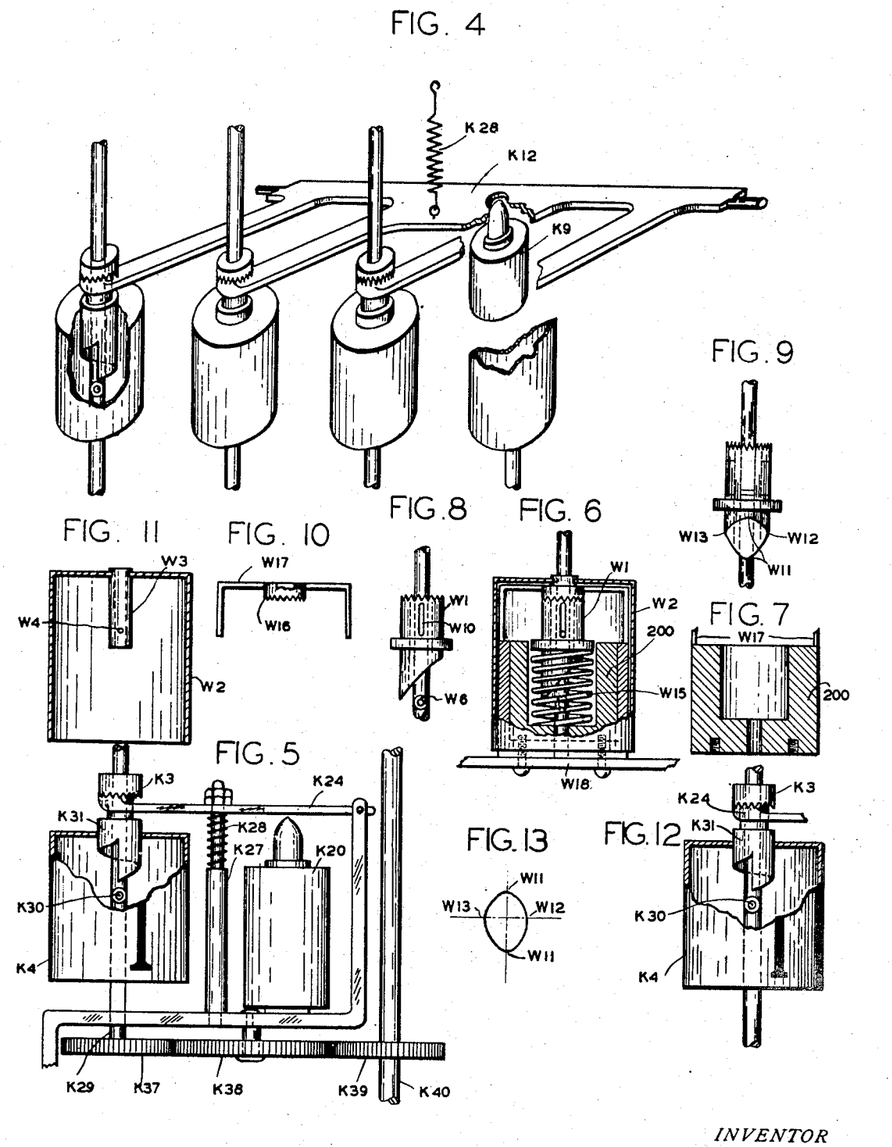

*Display register unit and commodity unit.*—Figure 5 illustrates an assembly of a display register unit for one of the digits of the last quotation, with the outer drum of the register broken away to show the cam movement. A side view of the driving gears, K37, K38 and K39 is also shown. An assembly of such display registers in a complete commodity unit, with the outer drum of the registers of the lowest shelf broken away to show the cam movement, and the fraction registers omitted to show the operating magnets, appears in Figure 3. Reference characters in Figure 5 correspond to those of the units register in the lowest shelf of Figure 3.

The display register unit assembly includes an electromagnet, K20, with its armature K24. The armature is kept in place by an upright bar, K27, which passes through a hole therein, the upward range of movement being limited by nuts against which it is pressed by return spring K28 when the magnet is not energized. The outer end of the armature, when the magnet coil is energized, presses downward the display register K4 and its cam, K31, mounted loosely on the shaft K29.

The register K4 is cup-shaped, for lightness. It carries on the outside of the cylinder a series of large figures, 1, 2, 3 . . . 0, with two blank spaces, or one blank space of double width, between the 0 and the 1. The outer end of the armature K24 is formed upward and is toothed, so as to effect engagement with the crown teeth on the lower surface of the retaining collar K3. Thus as the shaft rotates within the assembly to its predetermined position by the driving of the rotor, as has been described, the friction of the shaft against the cam cannot displace the register.

Also attached to the shaft K29 is a pin, with its roller K30. Positioned to bear upon this roller by downward movement is the spiral outline of the cam K31 as illustrated. The downward movement of the cam upon the shaft, forced by the armature attraction of the magnet coil, presses this spiral upon the roller, and as the roller is held to the shaft, which is in turn held by the associated roller, the cam with its attached display dial is caused to rotate until the end of the spiral is reached, the extent of movement being governed by the distance between the first point of contact of the spiral upon the roller and the end of the spiral. The required measure of movement to effect the display of the proper dial figure involves the distance relations between the motor movement, the shaft movement, the cam movement, and the figure spaces, and is a matter of constructional design. It is immaterial from what point the dial and cam may start their movement, the correct end of the movement is attained. The impulse to energize magnet K20 and move the dial to the proper position comes from contact L5 of the units switch L through contact R2 of relay R, wiper F20, and contact F24.

Figure 5 illustrates the preferred form of drive to be used in practice. K29 is the vertical shaft for driving one set of five registers, K40 is the main drive shaft for the other sets of registers not shown, and K37, K38, and K39, the connecting gears for transmitting power from the main drive 40 to the drive shaft actuating a single set of registers. To vertical shaft, as K40, would be connected, in a sectional unit, other commodity units, or as set forth above, other sets of registers.

Each of the display registers in the lowest shelf is the same as described, except for the display figures and the spacing on the fraction registers; for stock quotations these would be divided into seven eighths, with one blank space.

With the separate registers controlled by separate magnets, it is practicable to change the last quotation to correspond to a new price by selectively changing only such figure or figures as the change in price requires, leaving the others stationary. It has been explained that negative pulses from finger-pull dial A1 can be utilized by the operator to pass the sequence switch action over price selectors that are not to be operated.

It is to be noted that the transmitted figure is always the desired display figure, whether the standing figure to be changed is zero or an integer greater or less than the new figure, and that there need be no transmission of price figures except those to be changed.

In Figure 4 is indicated a unit of display registers for one of the upper shelves, as the open shelf of Figure 3. The register construction is the same as for the last shelf. There is, however, a single operating magnet, K9, and a single armature, K12, and return spring, K—28—a notable construction saving. The registers of the two upper shelves, previous close and open, will be operated only once a day, and those of the two shelves next below, high and low, relatively infrequently.

*Alternative display register unit.*—Figures 6, 7, 8, 9, 10, 11, show an alternative form of display register assembly. This is included for the purpose of illustrating that there is more than one specific means of applying the general means of controlling display figures which I claim in this relation.

Within the register is a solenoid 200, shown separately in Figure 7. To its armature is attached a cam, W1. The register W2, shown separately in Figure 11, has a sleeve bearing W3, which has a pin, W4. This pin bears in a slot W10 in the cam (Figure 8). The cam is thus permitted a vertical movement while the register is made to turn as the cam turns. The lower surface of the cam which bears on the roller W6, on the shaft, is not a single spiral, but embodies a substantially continuous cam edge, (Figure 13) restricted at the high and low portions thereof, merging into a flared intermediate portion, that is, the lower and upper portions thereof constitute contracted terminals, W11, having flared sides, W12, W13, with the blank registering spaces of the register corresponding to the higher restricted portions of the cam, as shown in Figures 9 and 13. When the cam presses upon the roller, due to the energization of solenoid 200, for the full length of either side of the cam, it turns the register to a blank position, while if in an incomplete distance, it turns the register forward or backward to the adjusted figure. Spring W15 normally holds the cam inoperative in engagement with the crown gear W16 carried by bracket W17 associated with the solenoid 200 fixed to plate W18.

Description of operation

The operations that occur in posting quotations on the registers of a particular unit of the quotation board exemplified herein will first be described generally, and then a detailed description will be given of the operations that occur when certain typical quotations are posted on the registers of a particular stock unit.

*General.*—In preparation for the day's display, the final figures for the preceding day's market are to be transferred from the last dials to the previous close dials, and all but the latter dials made to show blanks. The manner in which the previous close quotations are set up on the several commodity or stock units will be described below.

To transmit the selective impulses for posting quotations on the board, the operator must actuate dial A or A' as the condition of the registers on the board may require. Of course, in each case, the operator might disregard the quotation displayed on the last quotation shelf, that is shelf LQ, of a given stock unit, and she might transmit selective impulses for setting each of the registers on that shelf of the particular unit. This method, however, is inefficient. It is preferable to provide the operator with a device which displays the quotations for several stock units as they appear on the board to which she is transmitting. By referring to this device, the operator can determine at a glance what registers on the LQ shelf of a given stock unit must be reset to display a new quotation, and she will then transmit only the selective impulses required to effect this change. Furthermore, if the quotations received by the operator for transmission do not indicate whether the quotation on a given stock is a new high or a new low, a glance at the above-mentioned device will indicate these facts and the operator can then transmit the proper selective impulses.

Throughout the description to follow, it is assumed that the operator is provided with such a display device as the one mentioned above and that this device will enable the operator to determine what registers on the LQ shelf of a particular stock unit must be repositioned in order to display a new quotation on that shelf, and whether the new quotation constitutes a new high or a new low for that particular stock. This display device is not illustrated in the present application, however, and it forms no part of the present invention.

On the first quotation for a given stock, he transmits the selective stock number from dial A, followed by the price fraction (if any), the units price digit, and the tens digit, etc. If the units digit is a zero, it is necessary to transmit 10 pulses to change the blank to 0. If there is no fraction, dial A1 is utilized to pass over, or skip, the fraction selector: A blank display is considered sufficient in case there is no fraction, though when there is a tens digit but no units digit in the price, it is desirable, in order to insure the proper reading of the tens digit, to set the units register to zero.

For the opening quotation, the operator should also set up the circuits to cause his figure transmission to be effective on the high, low, and open shelves, which is done through dial A1.

For the second quotation on the same stock the operator can, after selecting the stock number, proceed to dial on A the new figure in its proper position: If it is a fraction, he will dial the figure corresponding to the new number of eighths, regardless of the standing reading; if there is no change in the fraction but one in the units, he will send one skip impulse from dial A1, to pass over the fraction selector switch, and from dial A send the figure corresponding to the new units. If there is then a change to be made in the tens, he will send the new tens figure; if there is no change, he will send a skip impulse from dial A1 to pass over the tens selector.

The change in this second instance will represent either a new high or a new low. The operator may select the one or the other, and let his transmission of the change, as above, suffice for the selected shelf. If, however, there have been other prices transmitted, and the operator cannot be sure that no shaft has been moved since the previous high or low registration for the particular stock, thus positioning a shaft roller for a different figure than the displayed figure in fractions, units, tens or hundreds, he should transmit all of the figures to be recorded. Otherwise, in a shelf with all figures acted upon by a single magnet, there would be error.

The operator transmits the desired resultant figures only, as changes are called for. If there should be an error in a given price transmission, it is not continued or cumulated, but is corrected with the next correct transmission. If the operator should discover that he has made an error in transmission at any stage, he can through sending dial A1 transmit impulses to advance the sequence switch to the no-register contact O17. A pause on this contact for a sufficient time for the slow relay C1 to release will release the switches without affecting the display dials, and permit the starting of a new operation.

*Detail operation.*—Following is a description in detail of operation under certain assumptions of figures. The stock number is taken as 21, and the price as 27⅜ at the market opening, with the previous close figures displayed and the other dials for the given stock showing blank.

*Selection of stock, 21.*—On sending dial A, 2 is pulled; on the return movement of the dial, contact A5 momentarily closes, sending 2 pulses, grounding conductor A6, energizing relay A3, which closes contacts A7 and A8; A8 grounding negative side of battery, A7 putting positive side of battery to line A9, energizing polar relay B, to attract armature B1 against tension of spring B2, closing contact B3, energizing relays C and C1, which close contacts C2 and C3. Contact C3 closing is grounded from conductor B4 and contact B5, which through conductor C6 energizes motor magnet D19 of sequence switch D, attracting its armature D17 against tension of spring D1, preparatory to advancing the sequence switch wipers D2 and D3 to the next step on completion of the pulse or series of pulses. Relay C1 is a slow release relay, and controls, through its contact C3, sequence switch D.

Relay C is also energized by two pulses from contact B3, closing momentarily contact C2, grounding conductor C4 and wiper D2; as wiper D2 rests on contact D4, the pulses will be transmitted to motor magnet E8 of the tens commodity selector E, and wiper E1 will be advanced two steps to contact E2, grounding the No. 2 tens contact F1 of connector F.

Dial A comes to rest, slow release relay C1 is deenergized, opening contact C3, deenergizing motor magnet D19 of sequence switch D; under tension of spring D1, wipers D2 and D3 are advanced to contact D5, where the second group of commodity selector pulses will be effective.

When the tens selector E moved from its zero position, cam springs E3, E4, E5, which are mounted on the switch shaft, were closed by cam E6. Spring E5 grounds conductor E7 and contact G1 of control relay G, grounding conductor G2, energizing magnetic clutch F2 of connector F, which advances its shaft, carrying forward all wipers, such as F21, F20, and the like. Wiper F3 is carried forward and contacts with contact F1, which has been grounded by selector E, grounding wiper F3 on the contact, which in turn grounds conductor F4, energizing relay G, opening contact G1, which removes ground from conductor G2, stopping motion of connector F. Relay G is now energized, and will so remain during the continuance of the operation, through contact G3, conductors G4 and D7 and cam spring D6.

The second, or units selector pulse is now dialed on A. Relays A3, C, C1, are energized as before described. At the conclusion of the first series of pulses, sequence switch wiper D2 was advanced to the units commodity selector contact D5. The pulse from relay C is now effective, advancing motor magnet H8 of the selector H, wiper H1, to the No. 1 contact H2, grounding contacts F5 and F6 of connector F.

On the forward movement of selector H, cam H6 closed springs H3, H4, H5, grounding conductor H7, closing through contact G1 the clutch circuit of connector F as before described. The energization will not be effective, however, as wiper F7 rests on grounded contact F6, grounding conductor F8, energizing control relay G5 through contact G6 of relay G, opening the clutch circuit at contact G7. Relay G5 is now energized, and held energized, by contact G8 as before described. At the conclusion of the pulse, relay C1 is deenergized as described, advancing sequence switch D to contact D8, the fraction price selector contact. If it be assumed that the connector F has been stopped on contact F1 of bank F28, and that the units stock selector H is advanced to another contact beyond H2, the following operations will take place. Upon the first movement of selector H connector F is operated, and the wipers, such as F7, begin to move over the contacts in the second sector of their associated banks. When selector H stops on a particular contact beyond the first, a corresponding contact in each of the sectors in bank F29 is grounded by means of the multiple connections, described above, between corresponding contacts in the several sectors. When the wiper F7 reaches the grounded contact in the second sector of bank F29, the connector F will be stopped in the manner above-described, and the registers of the unit corresponding to that contact will be conditioned for subsequent operation.

Registering quotation, 27⅜

*Setting of fraction.*—Fraction ⅜ is registered first, because of the greater frequency of fraction changes. 3 is pulled on dial A. Relay B is operated, energizing relays C and C1, which energize motor magnet D19 of sequence switch D, and transmit three pulses to wiper D2, contact D8, to the motor magnet J32 of the fraction price selector J, stepping wiper J1 to the third contact J2. Cam J6 advances with the movement of wiper J, grounding contacts J3, J4, J5. Contact J3 is grounded as wiper J1 is advanced; and pawl, as J10, is raised at each step of the selector.

Cam J7 is carried forward on movement of wiper J1, opening contact J8 and closing contact J9, putting one side of battery on conductor J16 to coils J17, J18, J19 and J20, through common conductor J30 of fraction rotor S (Figure 2). This circuit is completed from ground on conductor J22 through cam contacts J21, wiper J1, energizing coils J23 and J19 of the rotor, positioning armature J25 and main shaft J26 at the No. 3 position. Motion is transmitted to branch shaft K1, positioning pin K34 and all other like pins on the same shafting to the No. 3 position.

*Setting of units, 7.*—On completion of the fraction registration, wiper D2 was advanced to contact D9. 7 is now dialed on A. The motor magnet, L32, of the units price selector L is energized seven times, and wiper L1 is advanced to the seventh contact, L28. Cams L6 and L7 were advanced, as before described in relation to switch J; cam L7, however, is now positioned at the seventh contact, reversing the polarity of the rotor T, by reason of contacts L8 and L27 being closed. In this operation contact L8 grounds conductor L17, and L27 puts battery on wiper L1 to stator coils L23 and L24, positioning the units shaft L26 to the seventh position, and positioning branch shaft K29 and pin K30 to the seventh position.

*Setting of tens, 2.*—Sequence switch wiper D2 is advanced to contact D10 as before described. 2 is dialed on A, the motor magnet M26 of the tens price selector M advances wiper M1 to the second contact, M2. Magnets M23 and M24 of rotor U are energized accordingly, advancing rotor magnet M25, shaft M26', branch shaft K5, and pin K35 to the No. 2 position.

Shafts K1, K29, and K5, are now positioned, preparing the display registers for positioning to indicate when the various shelf and register magnets are operated.

If setting of a hundred digit were required, A would be dialed energizing N27, advancing wiper N1 to desired contact to correctly position shaft Z26.

*Registration on open, high, and low shelves.*—Wiper D2 of the sequence switch now stands on contact D12. It is evident from the foregoing description, that if the hundreds digit register was set, at the end of the hundreds group of selective impulses, the circuit of stepping magnet D19 of sequence switch D would be opened, and the sequence switch D accordingly advanced to place wiper D2 on contact D12. If, however, the hundreds digit register was not set, the operator would actuate dial A1 to advance sequence switch D one step, thus moving the wiper D2 from contact D11 of the sequence switch, to which it was advanced at the end of the tens group of impulses, to contact D12. 7 is pulled on dial A; the motor magnet, O25, of shelf selector switch O is energized seven times, stepping wiper O1 to the seventh contact, O21. Relay O18 is also energized from contact O20 as the shelf selector switch moves forward. On the stoppage of the switch, relay O18 is deenergized, grounding contact O19, wipers O1 and O1', grounding contacts O7 and O21. Contact O21 energizes relay P, grounding contacts P1, P2, P3, wipers F11, F10, F9, contacts F14, F13, F12, conductors F17, F16, F15, energizing shelf magnets K9, K10, K11, attracting armatures K12, K13, K14, downward against tension of springs such as K15, causing arms such as K16 to engage shoulders of dials, as K17, forcing their spiral cams, as K31 (Figure 5), against the shaft pins, corresponding to K30, and positioning the open, high, and low registers for the proper display figures according to the selected numerical settings of the branch shafts, as K29.

*Registration on last shelf.*—Wiper O1 is double-ended; its O1' end contacting with the common contact O7 on all positions except the sixth. In this operation, wiper O1' and contact O2 energize relay R, closing contacts R1, R2, and R3, which are grounded through cam springs J5 and the like, grounding wipers F19, F21, and conductors F23, F24, F25, energizing registers operating magnets K21, K20, K19, being one for each register in the last shelf, attracting their armatures K23, K24, K25, and forcing the several spiral cams, as K31, of the last registers downward against the shaft pins, as K30, and positioning them to the selected numerical settings of the several branch shafts, as K29.

27⅜ is now fully registered on the day's display registers on stock No. 21.

*Restoration of selector switches to normal.*—On the last selection, contact O22 of relay O18 is grounded, energizing slow relay O23, which being slow to release will later deenergize and momentarily close passing contact O24, which is grounded from contact O19, grounding conductor D15, wiper D3', contact D14, energizing, through conductor D16, release relay G9, which is held energized through contact G10, conductor G13, contact E4, and all other like contacts. Relay G9 energizing closes contact G11, and through conductor G12 release coils, as E9, are energized so long as cam springs, as E3, remain closed, which will be until all selectors reach their zero positions. Relay G9 will remain energized until the last of the selectors to be restored reach the zero position and open their contacts, as E4.

*Price changing from 27⅜ to 27⅝.*—This is neither a high nor low quotation. Stock 21 is selected for the sake of illustration, as described by transmission of 21 from finger-pull dial A; wipers F9 and the like turn to contact F12 and the like of connector F.

On this quotation, sequence switch wipers D2' and D3' occupy (numerically) lower end of the bank contacts. Wiper D2' now rests on contact D8, establishing a circuit to fraction price selector J. 5 is dialed on A; and as before described, selector J is stepped to its fifth position, as cam J7 has advanced to the fifth position, contact J28 is closed, putting battery on wiper J1 and on coils J29 and J17 of rotor S. Contact J8 of cam J7 is also closed, grounding conductor J16, completing the circuit to rotor coils J29 and J17, positioning the J31 end of armature J25 for the figure 5 and positioning shaft J26 and branch shaft K1 likewise.

As the units and tens digits are not changed, 2 is pulled on dial A1, relay A2 receives two pulses, closing contacts A10 and A11, and putting on the line A9 two pulses of negative battery, operating relay B6, grounding contact B7, by two pulses; and through conductor B8, contact C5, conductor C6, sequence switch D steps forward two steps, advancing wipers D2', D3', to the seventh contact, D12, making ready the circuit to operate shelf selector O.

It is assumed that 27⅝ is between the high and the low for the day, and so is to be registered only on the last dial. 1 is dialed on A; and in the manner described, wiper O1 is advanced to the first position on contact O2, energizing relay R, closing contacts, R1, R2, R3. Only contact R1 is effective, however, it being grounded through conductor R5 and contact J5. Wiper F21 is grounded from this source, grounding contact F25, conductor F26, energizing register operating magnet K19, and in the manner described changing the setting of the register from ⅜ to ⅝.

*Price changing stock No. 21 to a new high, 28⅝.*—The stock having been selected by dialing 21, 5 is dialed for the ⅝, causing the fraction price selector J to step to the fifth position, J27. Next 8 is dialed, stepping the units selector L to the eighth position, with wiper L1 resting on contact L28, energizing rotor coils L29 and L30, advancing the L31 end of armature L25 to the eighth position, carrying with it shaft L26 and branch shaft K29, setting pins K30 and the like to register 8 upon the energization of the operating magnets. Next 2, the tens, is dialed on A, and as before described branch shaft K5 is set to position 2. The fourth contact, O8, shelf of selector switch is wired to the operating magnet of the high register and consequently 4 is dialed on A, and shelf selector O is advanced to the fourth position O8. Wiper O1 now rests on contact O8, energizing relay O9, grounding contact O10, and through wiper F10, contact F13, conductor F16, magnet K10 is energized, setting the high registers to register 28⅝.

Wiper O1' rested on common contact O7, energizing relay R, closing contacts R1, R2, R3, and wipers F21, F20, F19, to operate the last shelf magnets K19, K20, K21, recording 28⅝ on the display registers as before described.

Wipers D2 and D3 now rest on contacts D13 and D14, setting up a release circuit as before described, and releasing the several selector switches.

*Posting the previous close quotations on the several units*

When it is desired to transfer the closing quotation registered on shelf LQ of the several commodity or stock units to the previous close shelf PC of these units, it is necessary for the operator to ascertain first the closing quotation on any commodity or stock for which the previous close quotation is to be posted. The manner in which he obtains this information is not material to the present invention. Let us assume that he desires to post the previous close on stock number 21, and that the closing quotation is the same as the new high 28⅝, the registration of which was just described. Let us assume also that the quotation mentioned was the last quotation posted on the board. The operator actuates dial A, selecting stock 21. Then he actuates switch A1 placing wiper D2 on shelf contact D12, extending the operating circuit C4 to include magnet O25 of shelf selector O. He then dials 2 on switch A which causes wiper O1 to energize previous close relay O12, which in turn causes the energization of previous close shelf magnet K33 of stock 21. Since shafts as Z26 have not been moved since the closing quotation was posted on stock 21, when the armature associated with magnet K33 is pulled down by that magnet, the dials of the shelf PC of stock 21 will take a position to register the closing price.

Following this operation, dials of shelves O, H, L, and LQ of stock 21 are set to blank. This is accomplished by first selecting stock 21, then setting wiper D2, through the operation of dial A1, on contacts D8, D9, D10, and D11, and on each of these positions "B" on switch A is dialled which sets shafts as Z26 of the several register units to positions corresponding to blank registrations of respective dials. Subsequently wiper O1 is set on contacts O13, O8 and O15 to extend the operating circuit to the open, high, low and last quotation magnets K12, K10, K11, and K19, etc., and the operation of these magnets, it is evident, causes the dials of these shelves to be set and register blank.

If the closing quotation on stock 21 is not the last quotation posted previous to the posting of the previous close quotation for that stock, it is evident that the shafts associated with the registers on the previous close shelf of stock 21 must be separately positioned in the manner described above. When this has been done, the previous close shelf magnet K33 of stock 21 is operated in the manner described above, and the registers on that shelf are positioned to display the same quotation that appears on the last quotation shelf. Following this, the registers on the other shelves of stock unit 21 are blanked in the manner explained above.

It is evident that by following either of the above described methods, whichever is applicable, in connection with each stock unit on the board, the closing quotation on each of the several stock units can be transferred to the previous close shelf of these units.

It will be apparent that the mechanism herein described can be utilized to transmit and display letters, words, and signals, as well as figures, and that it could be operated by transmitting devices manually or electrically actuated of much more rapid character than the devices illustrated.

Figure 14:
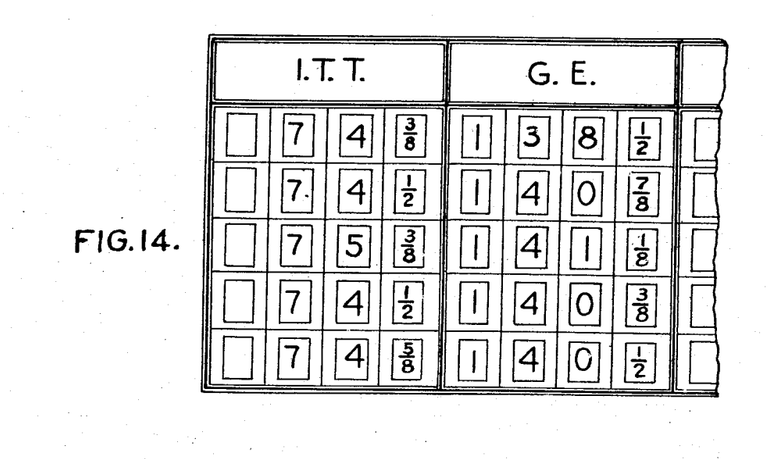
Fig. 14 is a fragmentary portion of the quotation board in elevation illustrating two other stock register units of the type shown in perspective in Fig. 3.

In Fig. 3 of applicant's system one dial unit only is shown but it should be understood that the dial magnets of other units have their circuits connected to corresponding contacts on the several banks of connector switch F. The portion of the quotation board shown schematically in Fig. 14 illustrates two other units for other stocks and of course the dial magnets (not shown) of these units are connected to other respective and corresponding contacts on the several banks of the connector switch F.

In the broader aspects of my invention I do not desire to be understood as limiting its embodiment to the forms herein illustrated, in view of the variety of mechanisms and circuits that may be utilized, within the scope of the appended claims, nor to be understood as limiting the uses of the machine to such as herein described or mentioned, in view of the variety that might be serviceable without departing from the scope of the invention.

Numbered according to certain associations, and not in due numerical order, I claim:—

1. In an automatic quotation display board, the combination of a driven shaft, a cam bearing fixed on said shaft, electrically selected means for driving said shaft and bearing to a given numerical position, a numerical figure display register mounted for rotation on said shaft, a cam associated with said register adapted to ride on said bearing and thereby to rotate said register to a corresponding numerical position, and electrical controlled means for moving said cam on said bearing.

2. In an automatic quotation display board, the combination of a driven shaft, a cam bearing fixed on said shaft, electrically selected means for driving said shaft and bearing to a given numerical position, a numerical figure-display register associated with said shaft, a cam associated with said register adapted to ride on said bearing and to actuate the register to a corresponding numerical position, means for holding the register stationary during movement of the shaft, and electrically controlled means for releasing the register and moving the cam on the bearing.

3. In an automatic quotation display board, the combination of a series of price display registers in corresponding selectors for adjusting said registers, means for variably operating each of said selectors by a series of electrical impulses, a sequence switch having means for switching the path of successive series of impulses to consecutive selectors, automatic means for advancing said sequence switch successively from selector to selector upon the occurrence between successive series of selected impulses of an interval of predetermined minimum length, and electrical impulse means for advancing the sequence switch at will past such selectors in the series which are not to be operated.

4. In an automatic quotation display board, the combination of a plurality of price display registers and corresponding selectors for adjusting said registers, means for variably operating said selectors by a series of received electrical impulses, a sequence switch for conditioning consecutive selectors for operation, relay means responsive to said received impulses, means responsive to said received impulses for stepping said sequence switch from association with one selector to association with the next consecutive selector upon the occurrence of a predetermined interval between successive series of said received impulses and means responsive to received impulses for advancing said sequence source past such selectors as are not selected for operation.

CLYDE SMITH.